INVENTORS
LEONARD R. STONE
THOMAS J. RADCLIFFE
BY GEORGE W. SOWER

W. H. Woodlief
ATTORNEY

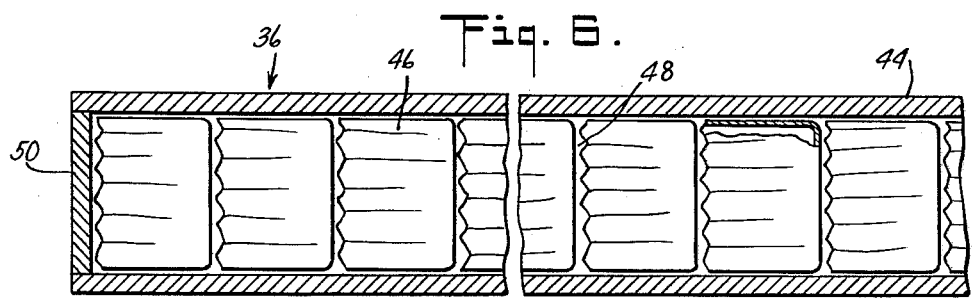
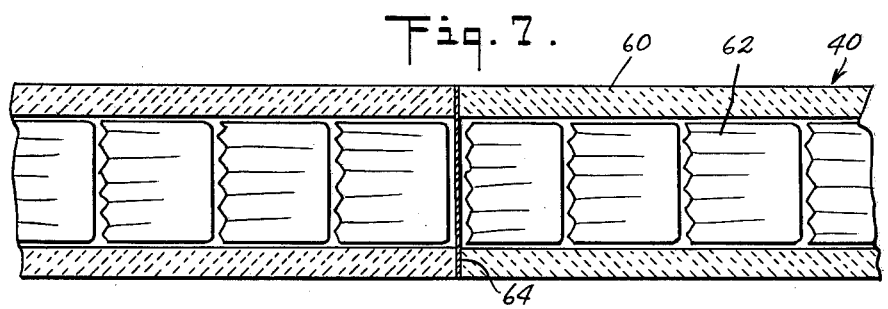
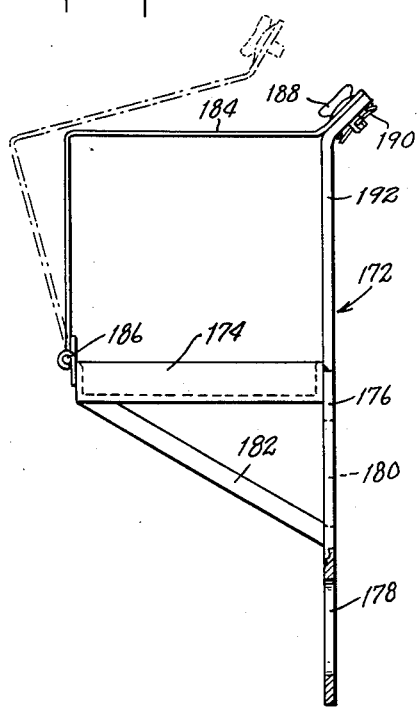
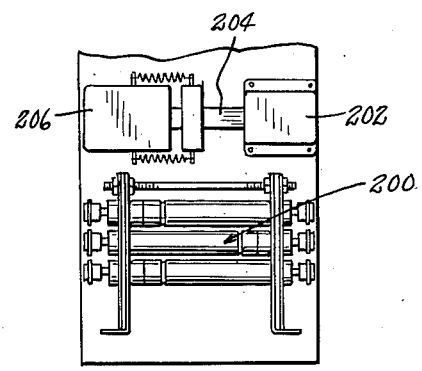
INVENTORS
LEONARD R. STONE
THOMAS J. RADCLIFFE
BY GEORGE W. SOWER
W. H. Woodlief
ATTORNEY

INVENTORS
LEONARD R. STONE
THOMAS J. RADCLIFFE
BY GEORGE W. SOWER

W. H. Woodlief
ATTORNEY

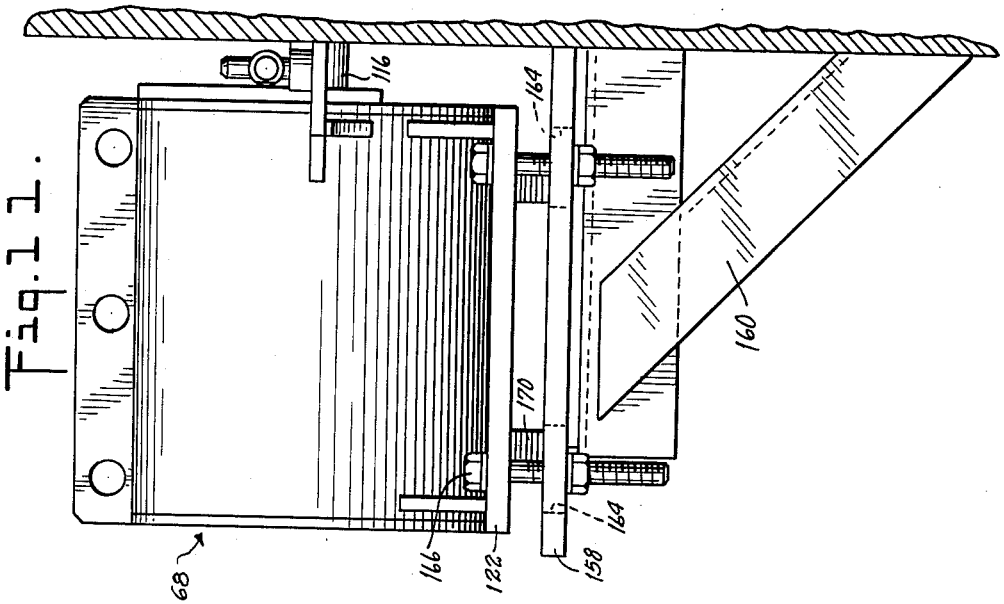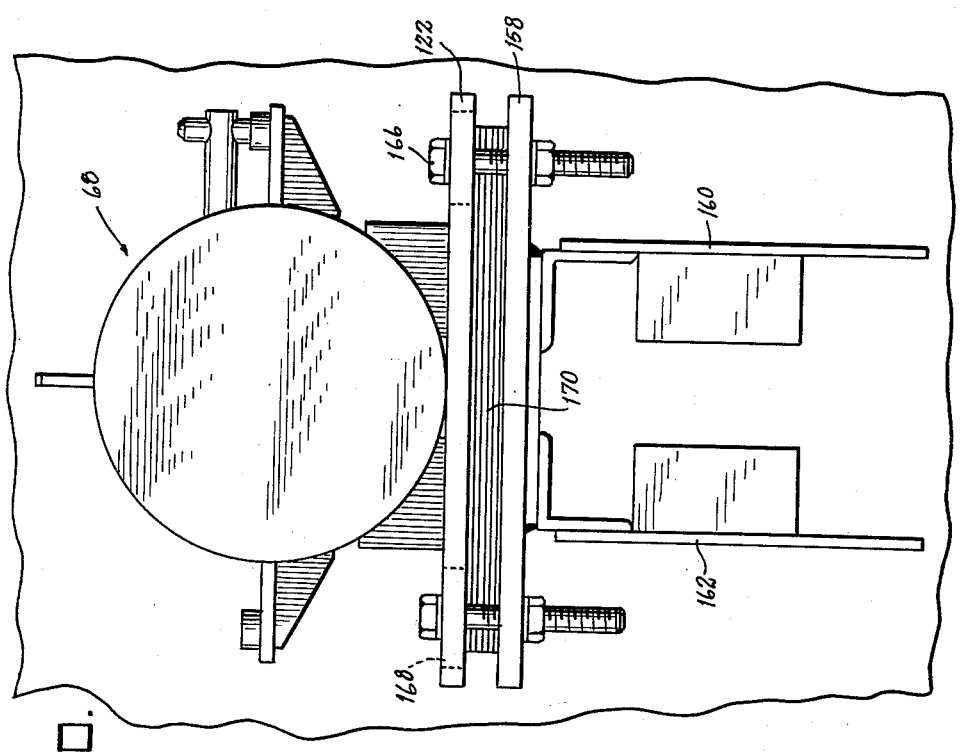

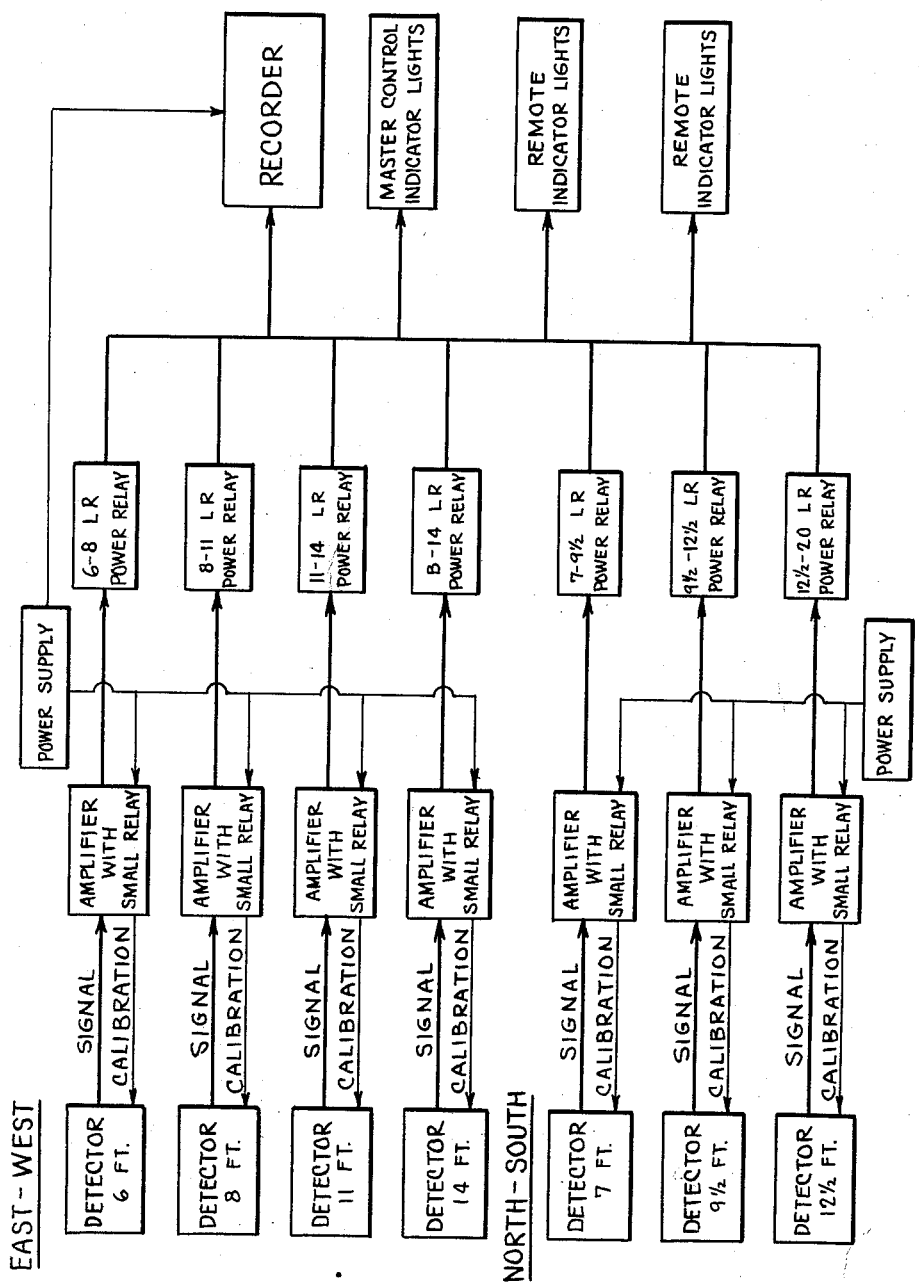

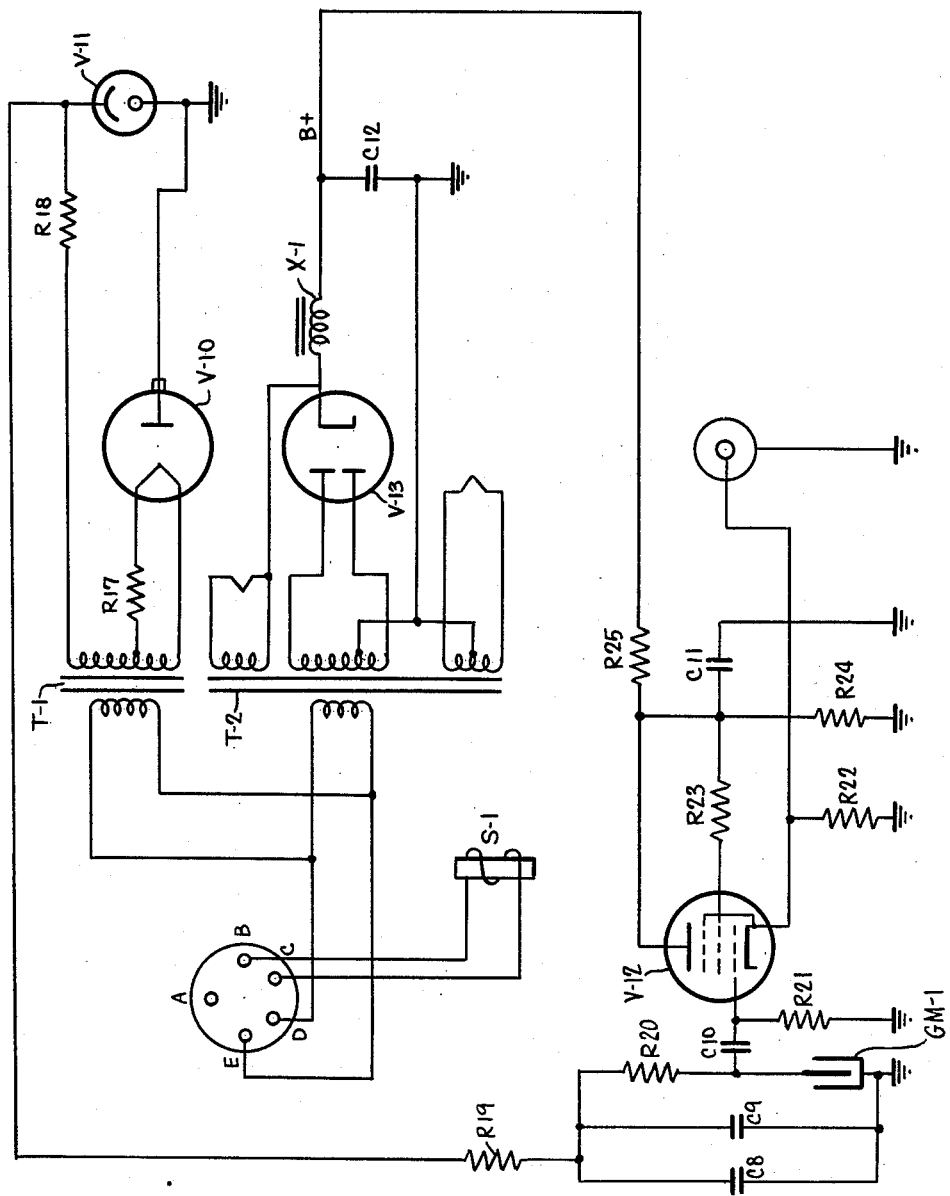

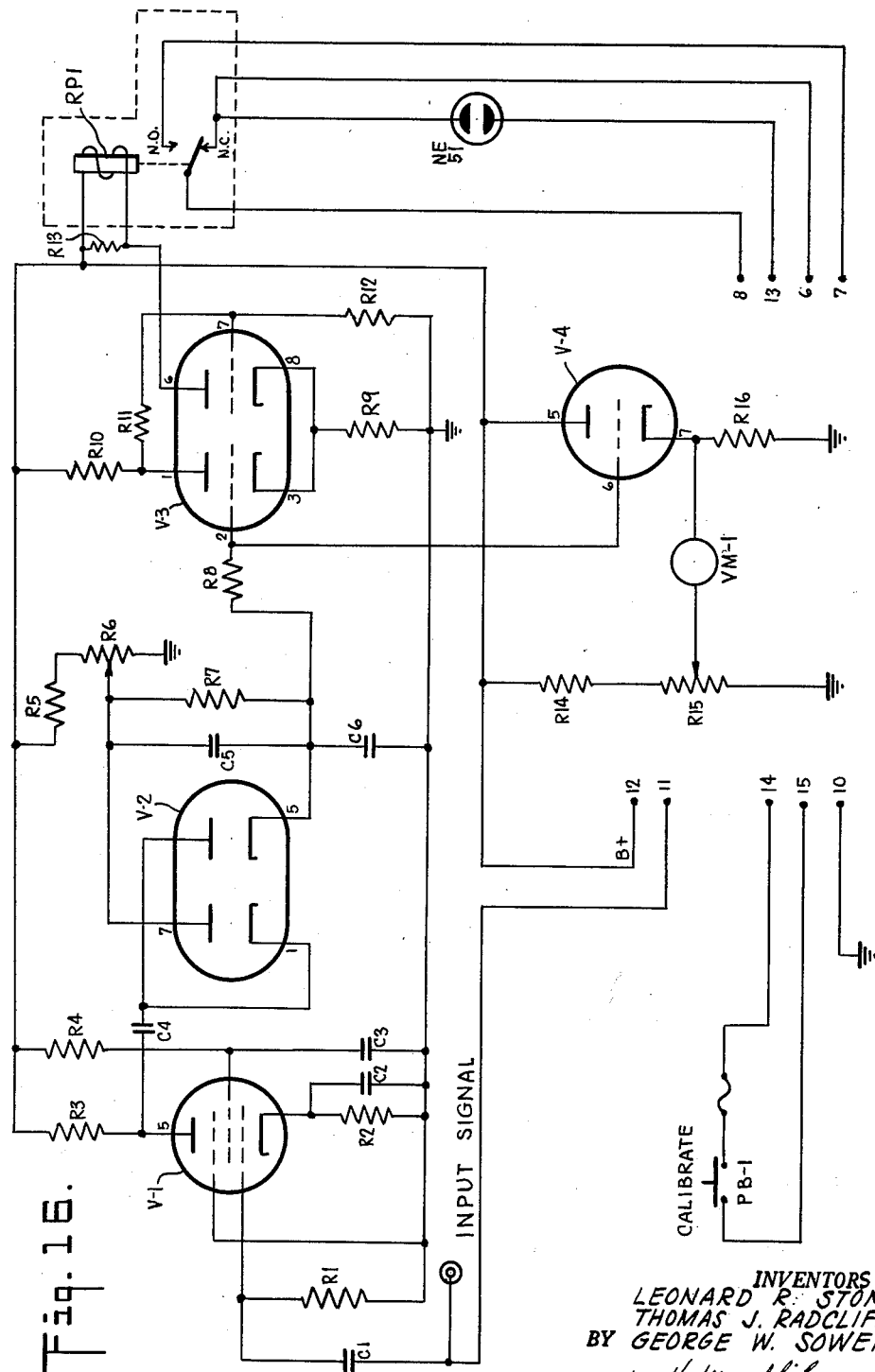

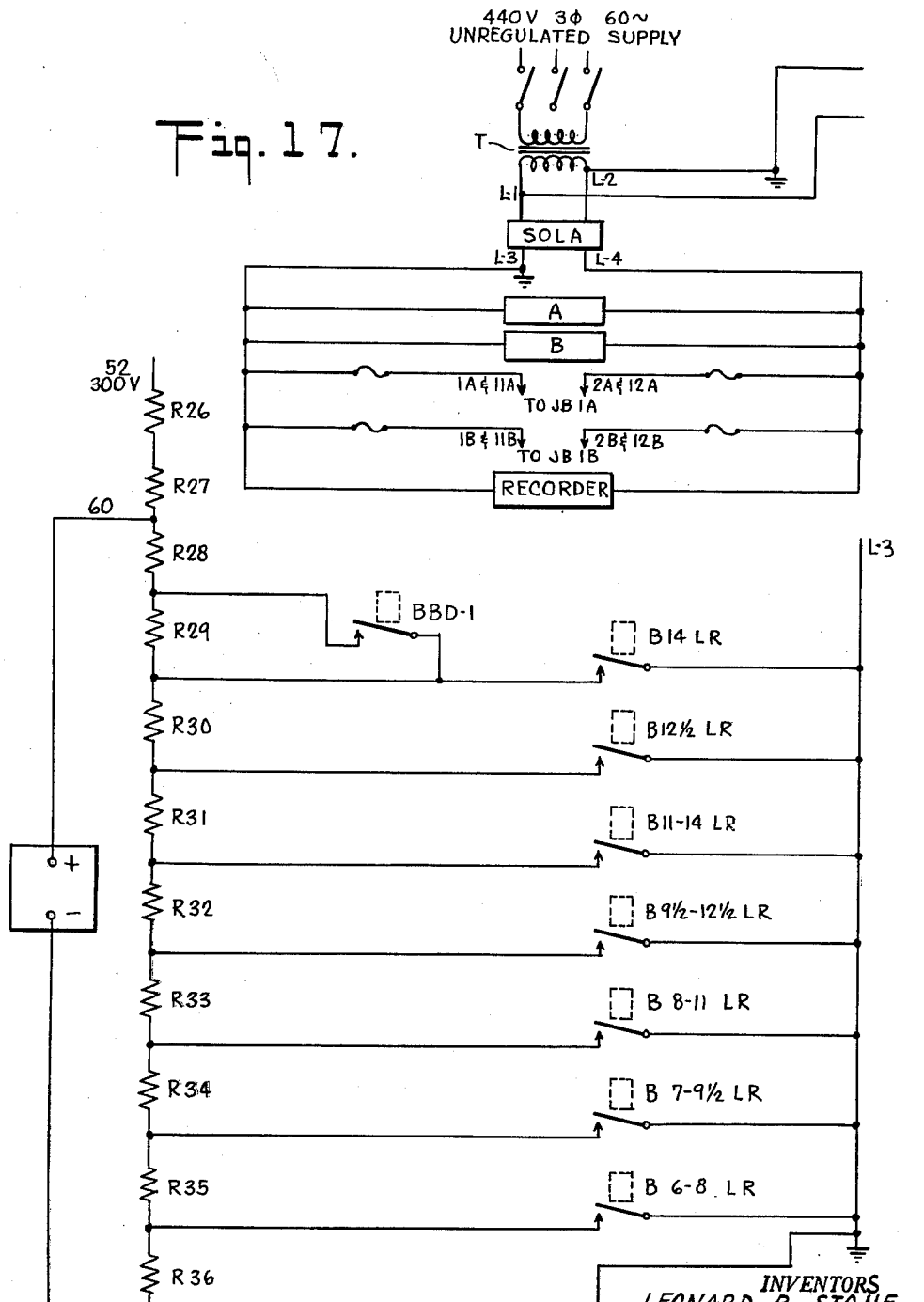

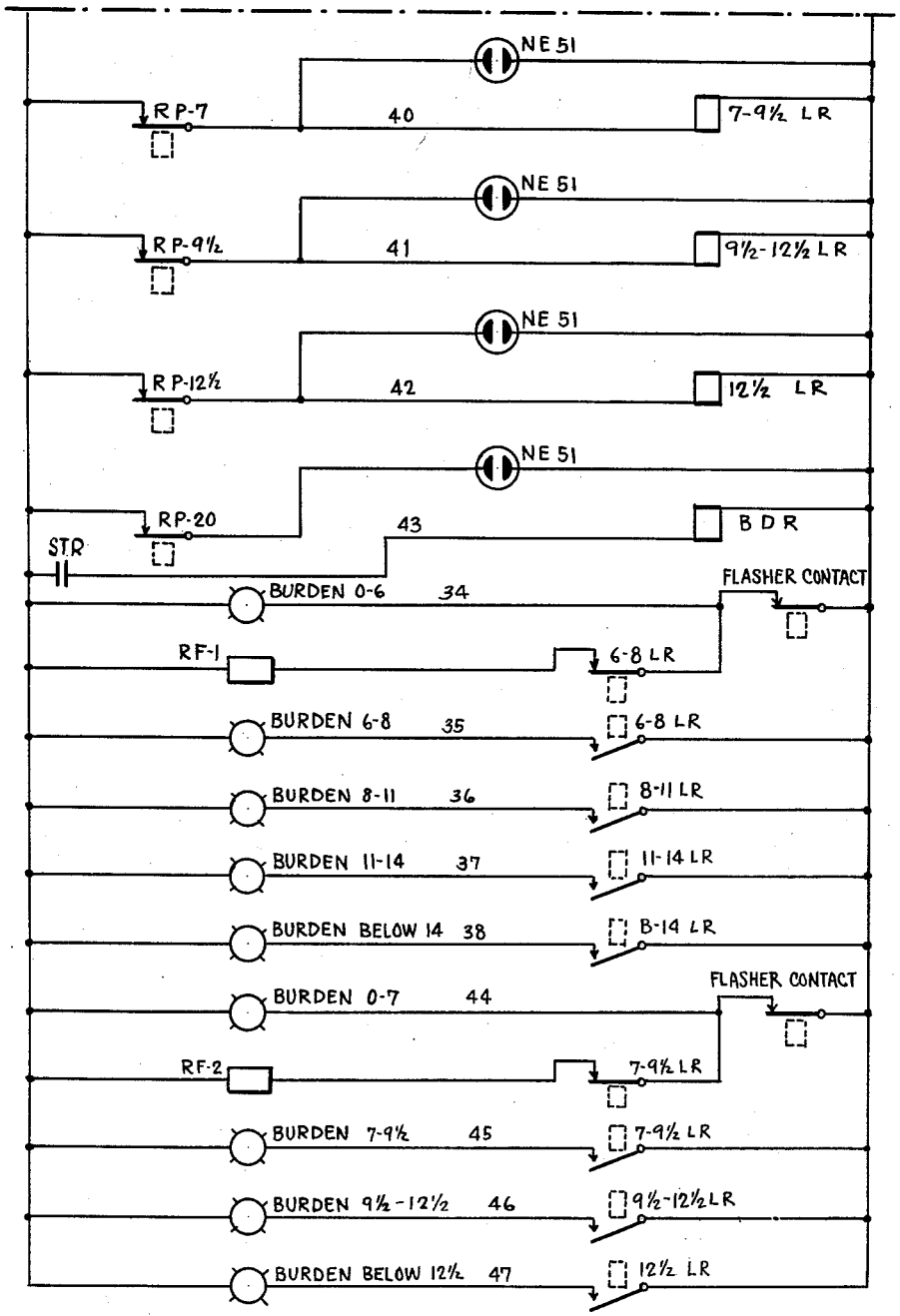

United States Patent Office 3,133,191
Patented May 12, 1964

3,133,191
BLAST FURNACE STOCK LEVEL CONTROL COMPRISING RADIOACTIVE SOURCE AND DETECTOR
Leonard R. Stone, South Euclid, Thomas J. Radcliffe, Warrensville Heights, and George W. Sower, Cleveland Heights, Ohio, assignors to Republic Steel Corporation, Cleveland, Ohio, a corporation of New Jersey
Filed Sept. 1, 1959, Ser. No. 837,403
25 Claims. (Cl. 250—43.5)

This invention relates to means for detecting the position and disposition of stock within a blast furnace.

The invention is predicated on the concept that a directional beam, generated externally of the furnace, can be passed through the furnace where it is not attenuated by the stock within the furnace, that such beam can be detected at the opposite side of the furnace, and that when a plurality of such beams are generated and detected at a plurality of furnace levels, they can be used to show the level of stock within the furnace. Accordingly, the invention in its broad application contemplates the generation, directional projection, and detection of beams of electrical energy, sound, light or of radioactive materials for the stated purpose.

In its more particular aspects, the invention concerns itself with a nuclear furnace stock gaging system for measuring and indicating the position of stock inside a blast furnace. The system contemplates an arrangement of radioactive sources on one side of a blast furnace and a corresponding arrangement of radiation detectors on the other side. Each radioactive source sends a narrow beam of radiation, e.g., gamma rays, through the furnace to its corresponding detector which measures the changes in the amount of radiation received and transmits corresponding signals which energize control circuits for indicating and recording the level and disposition of stock within the furnace, or which, in the alternate, may be employed to control an automatic furnace charging system.

The invention will be fully understood from the description of an embodiment which involves a furnace stock level indicating and recording system.

A blast furnace is a tall cylindrically shaped structure of furnace brick encased in an external shell of steel. The process of extracting iron from its ore involves charging a mixture of ore, coke and flux in proper proportions through a specially constructed charging chamber at the top of the furnace. The charging chamber has a small bell at the top of the chamber and a large bell at the bottom of the chamber which bells are alternately opened and closed to first fill the charging chamber and then release the charge of stock into the furnace. By this means, furnace pressures can be maintained and gases can be confined even though the furnace is charged with new stock at relatively short recurring periods.

For the proper operation of the furnace and to attain the best results, it is important to know at all times the level of the charge within the furnace and also whether the stock is evenly distributed therein. It is generally agreed that the level of the stock within the furnace should be maintained at a substantially constant height and that the furnace should be kept substantially full for best results. The stock within the furnace should also be evenly distributed in order to promote an even passage of the air blast therethrough.

Heretofore, the sole means for detecting stock level within blast furnaces has been the conventional mechanical stock level gage which consists of a winch operated weight and cable system. A weight at the end of a cable is lowered from the top of the furnace under control of a winch until the weight rests on the stock. The length of cable fed into the furnace is used as a measure of the stock level. This system is subject to a number of disadvantages which are generally recognized in the iron and steel industry.

Whenever the weight system is damaged, the furnace must be shut down for repairs. Continued operation without stock gaging could result in extensive damage to the furnace. Shut downs for weight repairs on blast furnaces aggregate costly loss in the iron production annually.

The conventional weight system of gaging presents serious safety hazards. Openings are required in the top of the furnace to permit entry of the weight and cable. The leakage of lethal gases at these openings makes the furnace top area dangerous to health and life. The use of high top pressures in blast furnace operations has increased this hazard on modern furnaces.

The replacement of the gaging weights and cables lost in furnaces is a difficult maintenance job. The weights frequently weigh as much as 600 pounds. Replacement of weights requires power hoist equipment and a maintenance crew of several men. Replacement of weights involves furnace shut down time ranging from ½ to 2 hours. This replacement operation is also dangerous to maintenance personnel because of carbon monoxide present in the area in which the work must be done.

Perhaps the most serious disadvantage of the weight-gaging system, from the point of view of accurate furnace control, is the fact that its indications are inaccurate and discontinuous. Inaccurate indications of furnace stock level result when the gaging weight sinks into the stock or slides into stock valleys. The indications are discontinuous since it is necessary to raise the weight to the top of the furnace whenever the big bell is opened to dump a fresh charge of stock, otherwise the weight may be buried and subsequently lost.

The present invention overcomes all of the foregoing difficulties and provides a stock gaging system which eliminates furnace shut down time, since none of the components of the system are within the furnace. The measurements provided herein are accurate and continuous and provide in addition to the measurement of stock height, an indication of the contour of the stock. Gas leakage at the top of the furnace is reduced to a minimum, since no holes for entry of gaging weights and cables are required. Maintenance safety hazards are greatly reduced because of the better atmosphere in which maintenance personnel may work, and because no work need to be performed on the top of the furnace.

These and other advantages and objectives of the invention will be further developed in the detailed description that follows, which description is illuminated by the drawings forming a part hereof.

In the drawings, like reference numerals indicate like parts, and in said drawings:

FIG. 6 is a detail view partially in section showing the radiation port of FIG. 4;

FIG. 7 is a detail view, partially in section, showing the radiation port of FIG. 5;

FIG. 10 is an end elevational view of the radiation source holder installed on a supporting bracket fixed to the outside of a blast furnace;

FIG. 11 is a side elevational view of the structure in FIG. 10;

FIG. 12 is a bracket structure designed for holding a radiation detection unit against the outer wall of the blast furnace;

FIG. 13 discloses a portion of a radiation detection unit including a bank of Geiger tubes and a calibration solenoid;

FIG. 14 is a block diagram of the system comprising principal features of the invention;

FIG. 15 is a schematic diagram of a radiation detector unit;

FIG. 16 is a schematic diagram of an amplifying and integrating circuit employed in conjunction with the detector circuit of FIG. 15;

FIG. 17 is a diagram of the power supply circuit;

FIG. 18 is a wiring diagram of a circuit used for operating a recorder; and

Figure 19A:
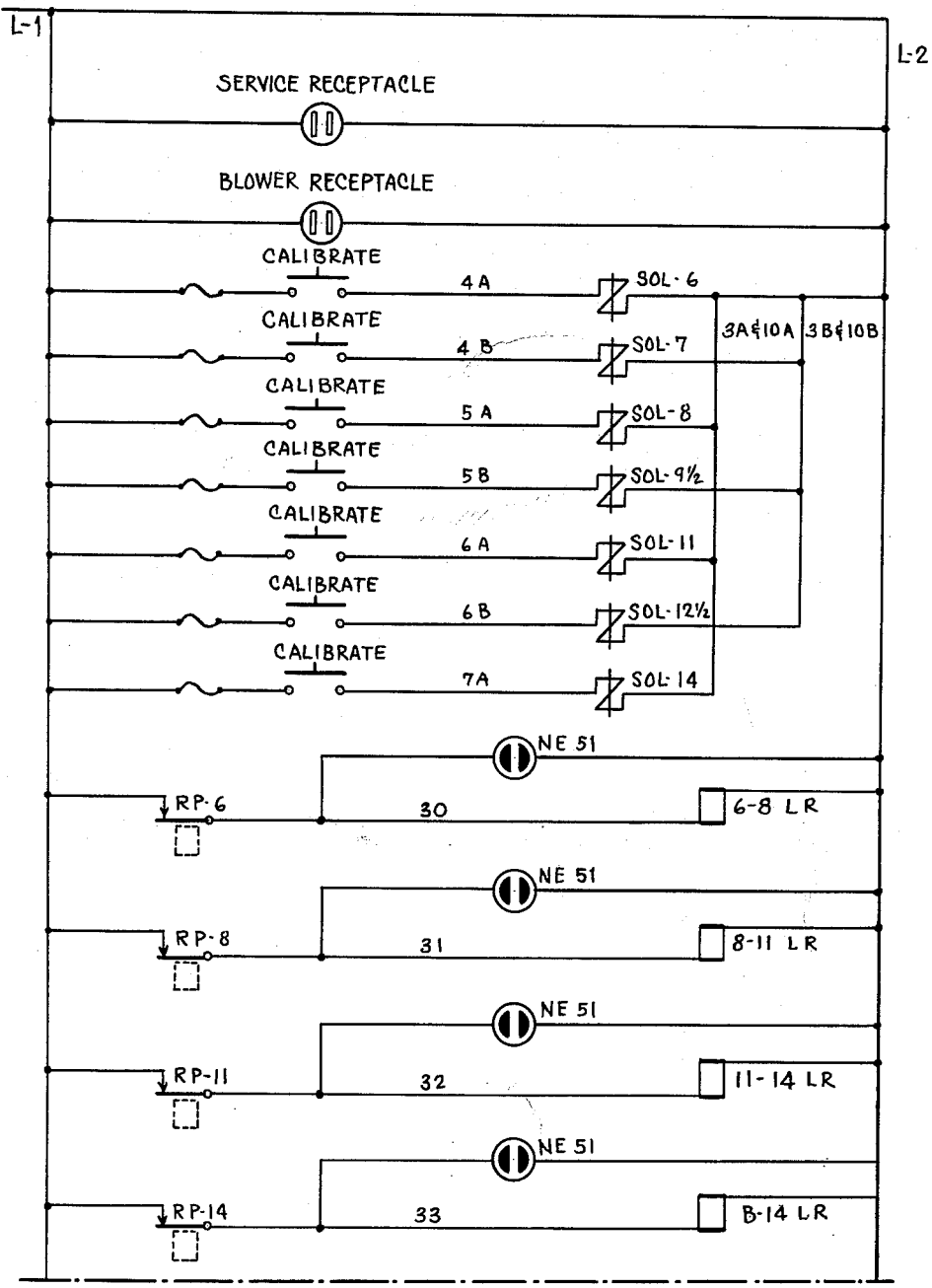

FIGS. 19A and 19B when taken together comprise a wiring diagram of a calibrating and indicating circuit including a plurality of power relays.

System Organization

Figure 1:
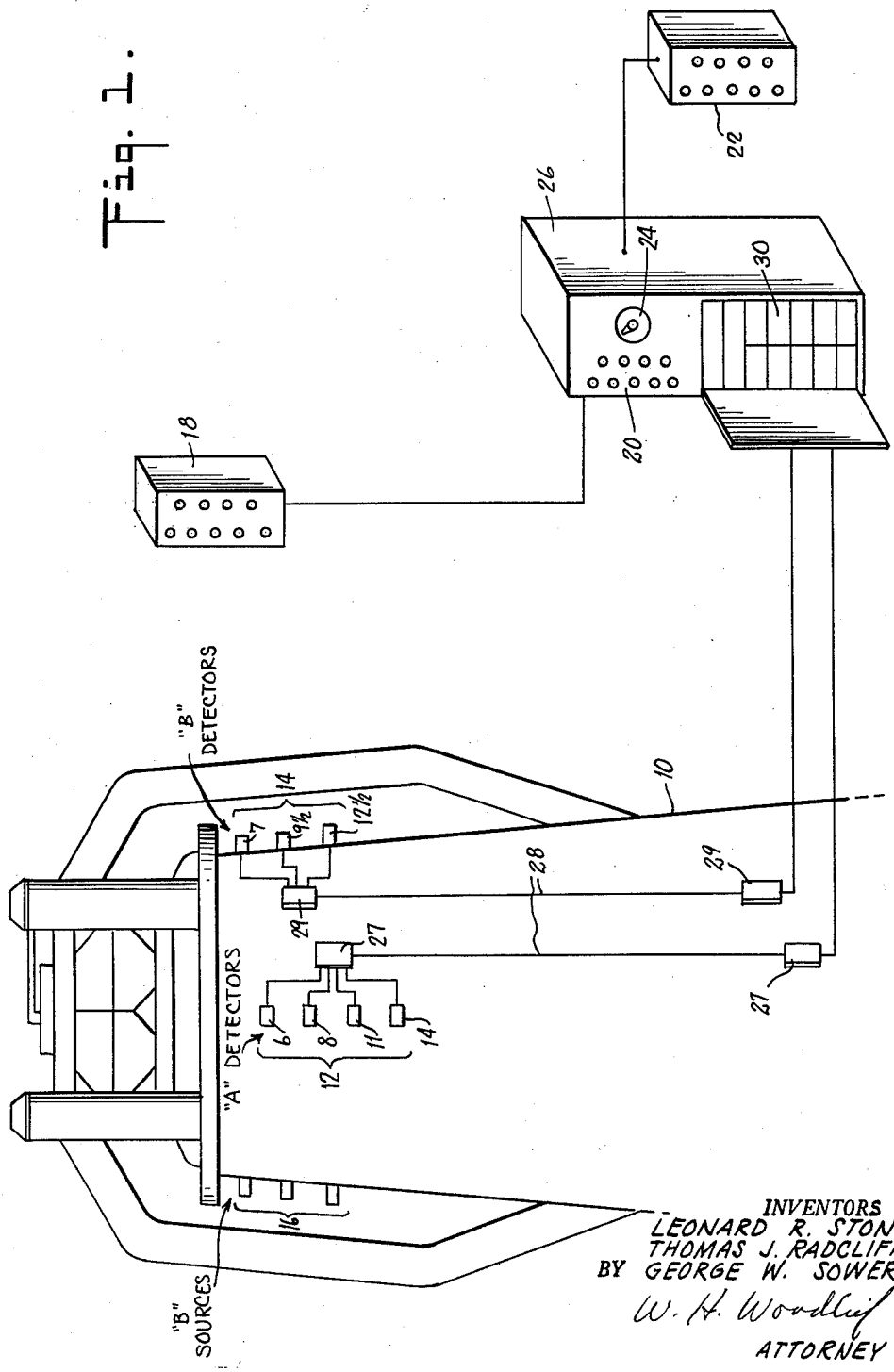
FIG. 1 is a diagrammatic representation of the blast furnace stock detector in association with the upper portion of a blast furnace and showing the remotely located components thereof.

As shown in FIG. 1, the upper portion of the blast furnace 10 has associated therewith a plurality of radiation detectors 12 and 14. In one installation, seven radiation sensing devices are mounted outside the furnace shell. These detectors are mounted on the south and west sides of the furnace at levels corresponding to paired radiation source containers 16 on the north and east sides of the furnace. Specific compass directions used herein have significance only as a convenient means of identification.

Each detector unit utilizes a matrix of halogen-quenched, Geiger tubes to measure the radiation beam coming from its respective radiation source on the opposite side of the furnace. Radiation passing into the Geiger tubes produces voltage pulses at their output. The number of voltage pulses produced at the output of the Geiger tubes is proportional to the amount of radiation detected by the tubes. Since the amount of radiation reaching the Geiger tubes is reduced when furnace burden obstructs the radiation beam, the pulses produced at the output of the tubes are also reduced. The pulses are then transmitted to an amplifying section in the control station.

Seven 1 curie cobalt 60 sealed radiation sources are respectively paired with the radiation detectors at a point on the furnace 180° displaced in respect to the radiation detectors with which they are paired. Each radiation source holder is a lead lined container equipped with a lever operated shutter to facilitate control of the radiation beam. With the shutter operating lever in the "on" position, a narrow radiation beam will emerge from the front of the container. With the shutter operating lever in the "off" position, the radiation beam is blocked by several inches of lead within the shutter structure and the container then constitutes a safe storage receptacle for the radiation source.

Three source containers, mounted on the north side of the furnace, send radiation beams through the furnace in a north-south direction. These source containers are mounted outside the furnace shell 7 feet, 9½ feet and 12½ feet respectively, below the bottom of the large bell. Four source containers mounted on the east side of the furnace send radiation beams through the furnace at levels 6 feet, 8 feet, 11 feet and 14 feet respectively, below the bottom of the large bell.

The radiation transmission system includes a unique radiation beam port design which provides an aligned coaxial path through opposite walls of the furnace for each holder-detector combination. The beam ports provide openings in the furnace lining and through its shell through which radiation is transmitted from the radiation source on one side of the furnace to the corresponding detector on the other side. Since both the radiation source and the detector are mounted outside the furnace shell, the beam ports are provided in the lining on both sides of the furnace. Without the openings, the solid furnace lining would attenuate any radiation beam directed through the furnace. The beam port openings are equipped with metal subdividing walls in the form of metal cups which prevent clogging of the openings by the furnace stock. These devices are almost transparent to gamma radiation and, therefore, permit efficient transmission of the radiation beam through the furnace at each level when stock is below that level.

Each detector unit contains its own high voltage power supply so that no high voltage cables need be disposed in the area in which furnace operating personnel normally works. Accordingly, the detector units in addition to the Geiger tubes include transformers, rectifiers and voltage regulators to provide between 850 and 950 volts direct current for the operation of the Geiger tubes. Finally, the detector units also contain a transmission circuit for the output of the Geiger tubes, and also adjuncts of a calibrating system all of which will be described in detail at a point hereinbelow.

The voltages developed in the detector units are transmitted to a control station 26 via transmission lines 28. The control station 26 includes an amplifier section 30, a power supply section, an indicator section 20 and a recorder 24.

As to be pointed out in connection with the circuit description to follow, the amplifier section 30 of the control station contains seven amplifiers, one for each detector unit. Each of the seven amplifiers receives signals transmitted from a detector unit via the transmission line 28 and by means of an integrating circuit, operates a small relay. In the exemplary embodiment, this relay operates a neon lamp and, as stated, it also energizes a power relay through which any desired control function can be performed.

In the present embodiment, the power relays control the indicator lamp system and the recorder. The indicator section of the control station consists of nine signal lamps 20 mounted on the front of the control cabinet. These lamps give a continuous visual indication of the level of the stock inside the furnace. Seven of these lamps correspond to the seven levels at which the detectors are mounted. The eighth lamp is a flasher which operates when the stock is above the 6 foot level, and the ninth lamp is also a flasher which operates when the stock is above the 7 foot level. When the level of the stock is above the 6 foot level, all of the lights in the bank of indicating lights 20 are off with the exception of the two flashing lights. When the stock is below the 6 and 7 foot levels, the flashing lights will cease flashing and will provide a continuous illumination. As the stock moves below each successive measuring level, the corresponding light for the level will come on. Each light will stay on as long as the stock remains below that particular level.

The recorder 24 at the control station 26 is a Leeds & Northrup Model H Speedomax Recorder with a 50-millivolt input which is supplied by a resistor network from the east-west power supply as to be described in more detail hereinafter.

The control station 26 will ordinarily be located in the gas house while the remote indicator lamps 18 and 22 may be located at other points such as, for example, in the stock house and in the cast house. The indicators 18 and 22 are duplicates of the indicator at the control station 26 and provide to the operators a continuous visual record of the stock level.

Mechanical Components

The blast furnace walls at the upper portion of the furnace are in the neighborhood of four feet in thickness and, therefore, constitute a substantial barrier to the passage of radioactive beams. For this reason, the furnace wall is provided, as stated, with beam ports for each radiation source and each corresponding radiation detector. Certain requirements are imposed on the beam ports to render them effective as beam conduits. They must maintain the gas-tight character of the furnace; they must transmit the radiation beams without substantial impedance; and they must be so constructed that they will neither become clogged and thus impede passage of the radiation beam, nor present an obstruction extending into the furnace.

Figure 2:
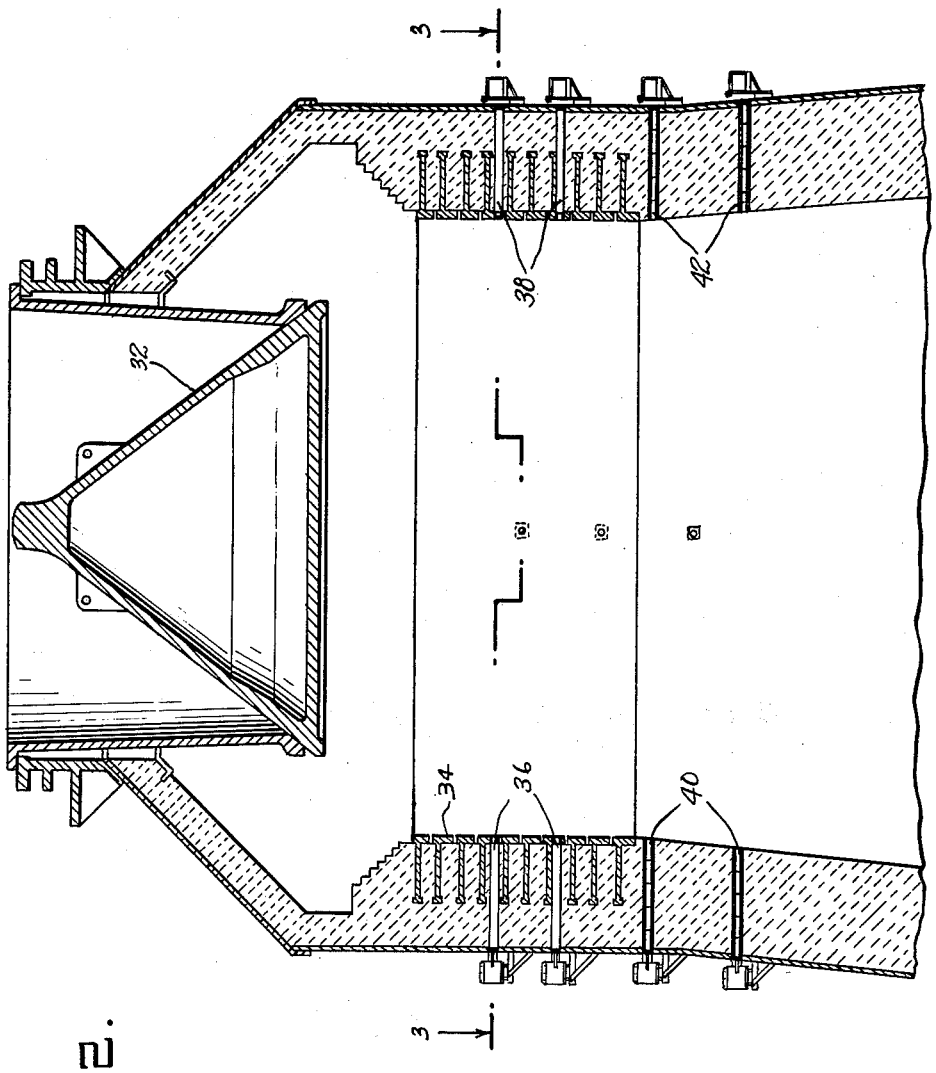
FIG. 2 is a vertical sectional view through the upper portion of a blast furnace indicating the location of ray ports in the furnace wall and associated radiation sources and detectors.
Figure 3:
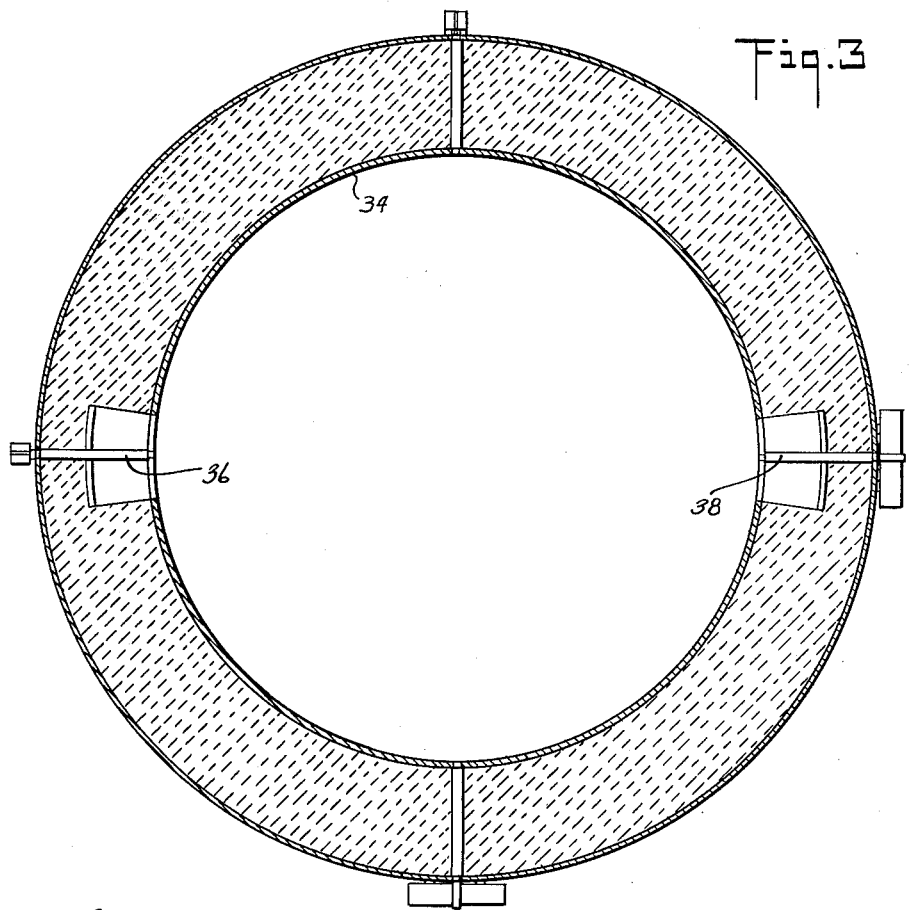
FIG. 3 is a horizontal sectional view through the upper portion of a blast furnace taken on line 3—3 of FIG. 2.
Figure 4:
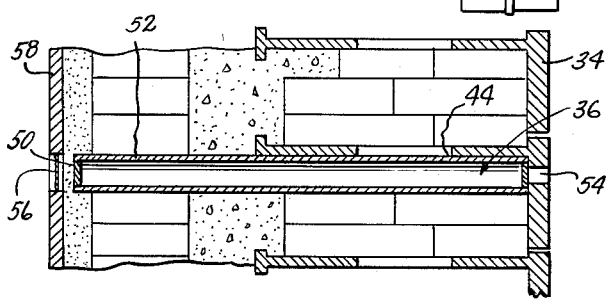
FIG. 4 is an enlarged sectional view through a portion of the furnace wall showing the installation of a ray port adapted for installation in a furnace wall protected by an abrasion lining.
Figure 5:
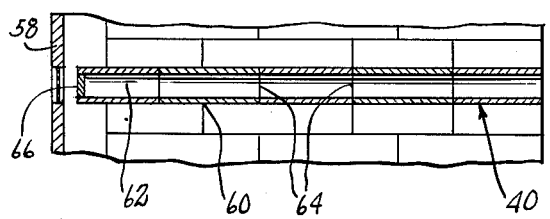
FIG. 5 is a sectional view through the furnace wall showing the installation of a ray port, adapted for installation in the unprotected brick work of a furnace wall.

The upper 10 or 12 feet of the furnace brick work below the large bell 32 has an iron facing 34, as shown in FIG. 2. The facing 34 is provided to protect the furnace brick from abrasion as the charge is dumped into the furnace. Below the protecting facing 34, the brick of the furnace is exposed. This difference in the internal form of the furnace dictates two forms of ray port structures. Accordingly, the ray ports 36 and 38 in the sheathed upper end of the furnace are installed as shown in FIG. 4 and are constructed as shown in FIG. 6, while the ports 40 and 42 below the sheathed portion of the furnace are installed as shown in FIG. 5 and are constructed as shown in FIG. 7. The design of the ray ports also takes into account the different temperatures that prevail at the points at which they are installed. The furnace temperature at the upper level, i.e., 6 to 8 feet below the bell is nominal, e.g., 300–400 degrees, but those at the lower level, i.e., 12 to 20 feet below the bell are much higher, e.g. 1400 degrees or more.

By reference to FIG. 6, it can be seen that the port 36 is in the form of a square steel pipe 44 in the neighborhood of 3½ feet in length such that it will extend from adjacent the steel outer furnace shell to the inner face of the protective sheath 34. The length of the pipe 44 is subdivided by a plurality of stainless steel partitions in the form of cups 46 shaped to snugly fit the interior of the pipe. The cups 46 are seated within the pipe substantially in contact with each other and are retained in position by refractory cement 48 which is placed around the edges of the cups before they are inserted into the pipe. After the cups have been inserted into the pipe, both ends of the pipe are sealed by welding into the ends a steel plug 50 about ⅛ inch in thickness. The port so formed is inserted into a duct 52 formed through the wall of the furnace such that the inner end of the port registers with an aperture 54, formed in the iron sheath 34 and the other end of the port is in registration with and terminates adjacent an "opening" formed in the outer steel jacket 58 by which the furnace is encased. In reality this "opening" 56 comprises a confined region of reduced thickness in the furnace shell 58—said region having an area larger in diameter than the port 52 to compensate for relative shift between port 52 and the jacket 58 that normally occurs as a result of expansion of the brick work. The port is held in position by frictional engagement with the brick work.

The ports 40 and 42 which extend through the brick work of the furnace below the protective sheath 34 are not protected from the normal abrasion and deterioration to which the furnace lining in that area ordinarily is subjected. Therefore, the ports for this area are constructed such that they will wear away as rapidly as the brick work in which they are mounted; otherwise, they would eventually form projections into the furnace which would impede the movement of the charge therein. Accordingly, the ports 40 and 42, as shown in FIG. 7, are constructed of hollow furnace brick 60 into which stainless steel cups 62 are mounted, as described in connection with the port structure of FIG. 6. A plurality of furnace bricks 60 so modified are installed in alignment as shown in FIG. 5. Since the furnace wall is in excess of three feet in thickness at the point of installation and the fire brick is about nine inches in length, five such bricks are employed to form each port. Adjacent bricks may be separated by a transverse stainless steel plate 64 about .008 inch in thickness and, as shown in FIG. 5, the outer end brick of ports 40 and 42 is sealed by a thin steel plate 66; these bricks terminate adjacent the furnace wall 58. The wall 58 is reduced in thickness at the region 66 opposite end bricks 62 to minimize the attenuation of the radiation beam.

The ports associated with the radioactive sources project the radiation beam toward the related ports associated with the radiation detectors in the form of a slender column; this dictates that each set of ports must be in axial alignment for reliable operation.

Figure 8:
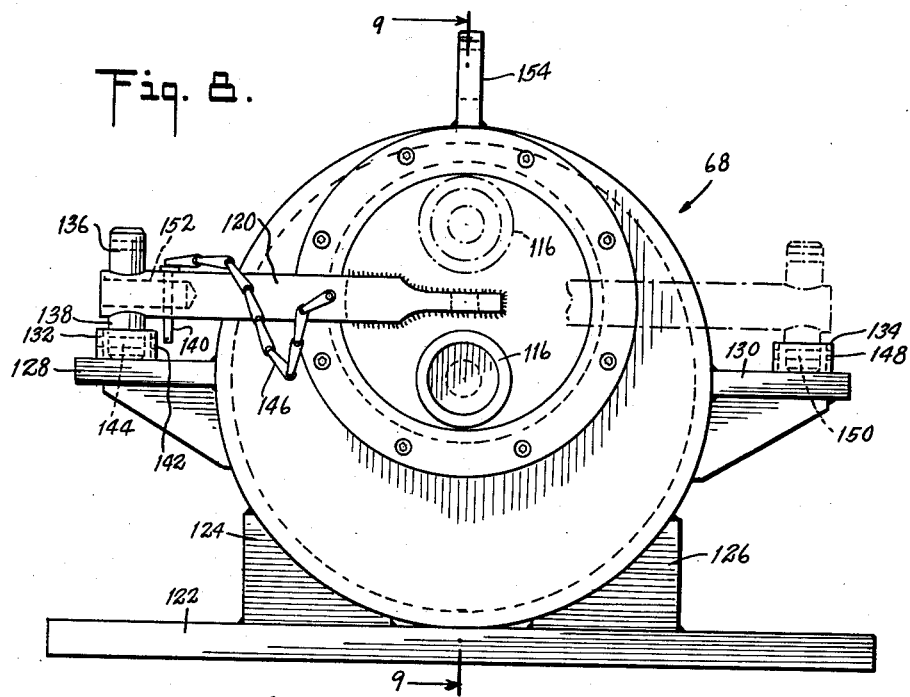
FIG. 8 is an end elevational view of a radiation source holder.
Figure 9:
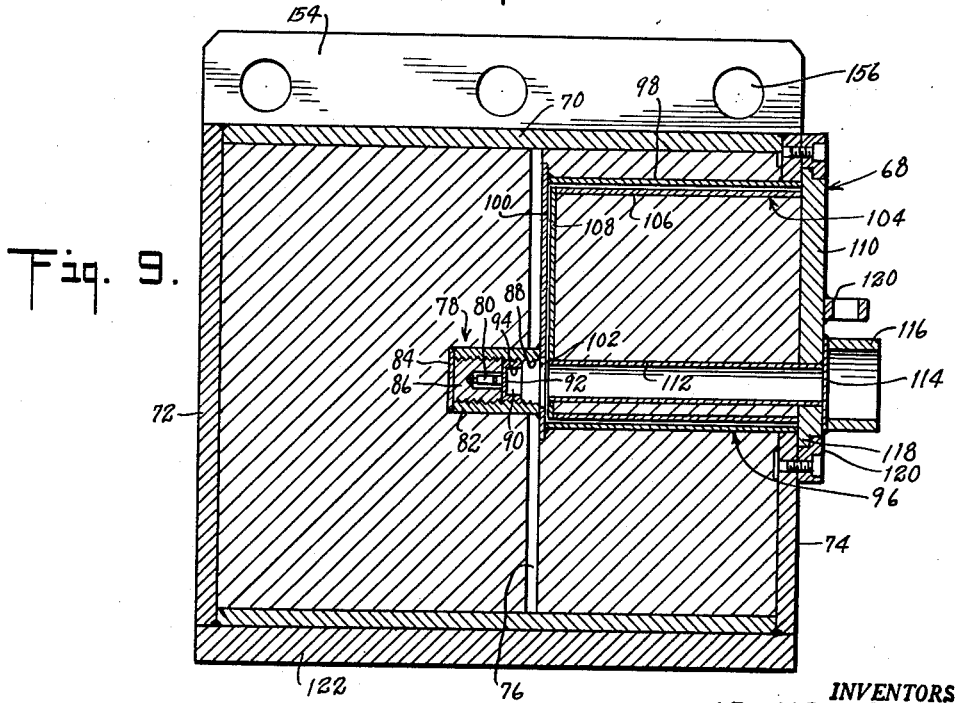
FIG. 9 is a cross-sectional view of the radiation source holder taken on line 9—9 of FIG. 8.

Mounted on suitable brackets on the outside of the furnace are the radiation source holders each of which constitutes a receptacle for suitable radioactive material. A radioactive source holder is illustrated in FIGS. 8 and 9, while the mounting thereof on the outer wall of the furnace is shown in FIGS. 10 and 11. A one curie cobalt 60 radiation source is sealed in each of the source holders. Any other suitable radioactive material, such as radium or cesium 137, may be employed, for example. Each source holder is equipped with a lever operated mechanical shutter to facilitate control of the radiation beam. With a shutter operating lever in the "on" position, a narrow radiation beam, as stated, will emerge from the front of the holder and pass through the related beam port. With the shutter operating lever in the "off" position, the radiation beam is blocked by lead, and the holder, under these conditions, is a safe storage and shipping receptacle for the radiation source.

By reference to FIGS. 8 and 9, it will be seen that the source holder 68 consists of a cylindrical side wall 70 and a pair of end walls 72 and 74. An internal radial brace 76 extends across the diameter of the container substantially intermediate the length of the side wall 70. Supported in the brace 76 is a capsule 78 adapted to hold a quantity of radioactive material 80. The capsule 78 has a tubular body portion 82 which is open at one end and sealed at the opposite end by a plate 84 welded thereto. The bottom half of the capsule is filled with lead 86 which has formed therein a suitable cavity for holding the radioactive material 80. The outer end of the capsule 78 has formed therein internal screw threads 88 adapted to engage the corresponding threads of a closure nut 90. The closure nut 90 has a thin head wall 92 to minimize its impedance to the flow of the radiant stream generated by the source material 80. After the radiation source material 80 is placed into the cavity of the capsule, the screw 90 is engaged by its hex socket 94 and is screwed down within the capsule 78 until the wall 92 thereof is in contact with the lead filling 86 and the radiation source material 80 is secured within the capsule.

The capsule 78 is formed as an extension of a shutter chamber 96 formed between the end wall 74 and the brace 76. The shutter chamber 96 is composed of a cylindrical body 98 and an end wall 100. The end wall 100 has an aperture 102 which registers with the capsule 78. The outer end of the cylindrical body 98 is welded into an aperture of corresponding size and shape formed in the end wall 74 of the holder. The shutter chamber 96 is adapted to receive a shutter mechanism 104 by which the beam aperture 102 in the plate 100 can be closed. The shutter mechanism 104 consists of a cylinder 106 which is only slightly smaller in both circumference and length than the cylindrical body 98. The inner end of the cylinder 106 is closed by an end plate 108, while the outer end thereof is welded to a face plate 110. Located eccentrically along the length of the shutter structure is a tube 112 which is adapted to register with the beam aperture 102 in the end plate 100 of the shutter housing 96. The outer end of the tube 112 extends through the face plate 110 of the shutter where it is sealed by a thin plate 114 which has welded thereto a short outwardly projecting tube 116 adapted to extend substantially into contact with the outer wall of the furnace.

The face plate 110 of the shutter has an annular shoulder 118 formed therein which is adapted to seat in a correspondingly flanged annulus 120 which is fixed to the plate 74 and which provides a bearing surface on which the shutter structure can be rotated.

Welded to the face of the plate 110 is a shutter operating lever 120 which extends in a radial direction beyond the diameter of the container. By manipulating the operating handle 120 from the full line position of FIG. 8 to the dotted line position of the same figure, the tube 116 and the beam tube 112 will be rotated from the full line position of FIG. 8 in which the shutter is open to the dotted line position of FIG. 8 in which the shutter is closed. The interior of the container 68, as well as the interior of the shutter 104, are filled with lead such that when the shutter is operated into its closed position, the lead in the shutter chamber will be shifted into the path of the radiation beam and will thereby avoid radiation to the exterior of the container.

As shown in FIG. 8, the holder 68 is mounted on a base plate 122 by means of a pair of mounting brackets 124 and 126 at both the front and rear ends of the holder. The base plate 122 has suitable bolt holes by means of which it is attached to a mounting bracket as will be shown in connection with FIGS. 10 and 11. Extending outwardly in a radial horizontal direction at the center line of the holder are a pair of brackets 128 and 130. These brackets have mounted thereon sockets 132 and 134, respectively. The sockets are in the form of a nipple adapted to receive lugs 136 and 138 extending in opposite radial directions from the free end of the shutter operating lever 120. Thus, when the shutter is turned to its on position, the lug 138 will extend into the socket 132, such that a pin 140 may be passed through aligned passages 142 and 144 in the socket and lug, respectively. The pin 140 may be attached to the shutter operating lever 120 by means of a flexible connection such as the chain 146. Thus the shutter can be latched in its open position.

When the shutter is closed by rotating the same about its axis by means of the shutter operating lever 120, the lug 136 on the shutter operating lever 130 will enter the socket 134 as shown in the dotted line position of the operating lever in FIG. 8. When so disposed, the pin 140 can be passed through registering passages 148 and 150 in socket 134 and lug 136, respectively.

Furthermore, the free end of the shutter operating lever 120 has an axial bore 152 therein which is adapted to receive an extension rod (not shown) which may be latched to the shutter operating lever 120 by the pin 140 by passing the pin through registering passages in the socket 152 and the end of the extension lever. Ordinarily, the shutter can be operated by means of its operating lever 120 but after long periods of time without shutter manipulation, it may require the added leverage afforded by an extension lever.

A rib 154 is welded in an axial direction along the top of the holder. This rib has a plurality of holes 156 therethrough so that it affords a means for attaching hoist mechanism for elevating the holder into position at the top of the furnace.

A platform 158 is supported from the outside furnace wall by means of a pair of brackets 160 and 162 as shown in FIGS. 10 and 11. At each position provided for the installation of a radiation source holder, the platform 158 has elongated bolt holes 164 at the four corners thereof adapted to receive four holder mounting bolts 166. The corresponding bolt holes 168 in the base plate 122 of the source holder are elongated in a direction at right angles to the length of the bolt holes 164 of the platform 158. This provides for universal adjustment in the horizontal plane of the source holder such that it can be accurately aligned in respect to the beam port with which it is to be associated. Adjustment of the source holder in the vertical plane is accomplished by interposing shims 170 between the platform 158 and the base plate 122. In order to render the adjustment in the vertical plane effective, the platform 158 will usually be fixed to the outside furnace wall at a point which is slightly below the theoretical optimum point for supporting the source container.

As seen in FIG. 11, the source container is so mounted that the tubular projection 116 of the shutter structure is substantially in contact with the outside furnace wall when a proper installation is made.

The radiation detection equipment, including the circuits of FIG. 15, is mounted on a suitable chassis which is placed within a protective metal box. These detector boxes are supported adjacent the outside furnace wall such that the Geiger tube cluster of the detector unit is disposed at the outer end of the radiation ports with which the units are associated. To the end that the detector units may be easily mounted, a mounting frame 172 such as that shown in FIG. 12, is fixed to the outside furnace wall at the area of each detector unit ray port. The mounting frame 172 consists of a flanged base 174 of a size and outline to embrace the detector unit box. The flanged base 174 has welded thereto a pair of attaching straps 176 each of which has a pair of elongated slots 178 and 180 extending therethrough. The flanged base 174 is supported further by means of a bracing member 182 extending between each of the straps 176 and the bottom of the flanged base 174. A detector unit holding band 184 has a hinged connection 186 with the upstanding flange at the front of the base 174 about the intermediate length of the base. This strap 184 is adapted to tightly embrace the detector unit box when it is placed in position, and it includes a fastener 188 which engages a latch element 190 carried at the upper end of a latch holder 192 which is welded to the upstanding flange at the opposite side of the base at a position directly in line with the hinge 186.

Suitable attaching bolts are welded to the outer wall of the furnace such that a bolt is provided for each of the elongated bolt slots 178 and 180 in the straps 176. The adjustment of a detector unit in respect to its ray port is not as critical as the adjustment of the source holder in respect to its ray port. Nevertheless, the mounting frame 172 can be raised or lowered within the limit of the slots 178 and 180 to achieve the best position of the detector unit in relation to its associated ray port.

The foregoing has alluded to components of a calibration system in each of the detector units. FIG. 13 illustrates an array of Geiger tubes 200. This array represents 24 Geiger tubes arranged in three rows which are staggered in respect to each other in the vertical direction as viewed in FIG. 13. These tubes are wired in parallel to produce an accumulative effect of the number of voltage pulses obtained from the individual tubes. The Geiger tube array of FIG. 13 represents a successful installation of the system. Subsequent inquiries, as stated, have demonstrated that the number of tubes may be drastically reduced without any substantial loss of efficiency.

Provision has been made for periodically checking the system and for this purpose, each detector unit includes an alternating current solenoid 202 located adjacent the area of Geiger tubes 200. Aligned with the core 204 of the solenoid is a lead container 206 which surrounds a Plexiglas rod in which a small piece of radioactive cobalt has been embedded. The core of the solenoid and the Plexiglas rod are connected such that when the solenoid is energized, the radioactive source is pulled out of the lead container thereby exposing the Geiger tubes 200 to additional radiation. A greater number of pulses are then observed at the detector output. When the solenoid is deenergized, a spring pulls the source back into the lead container 206 thereby shielding the Geiger tubes from the calibration radiation source. It will be pointed out in connection with the circuit description that calibration pushbuttons at the control station 26 are adapted to energize the solenoid 202 whenever it is desired to calibrate the system. It is sufficient to say at this point that when the calibration push-buttons in the control station 26 are operated, the operator is able to check the complete system by observing a voltmeter in the control station. A voltage deflection of 1 to 2 volts at the voltmeter is an indication that the system is operating accurately.

*Electrical Operation*

To provide maximum reliability, the electrical system of the stock level gage is designed to include two completely independent gaging systems. The east-west gaging system represents one of the separate, independent electrical systems, and the north-south the other. Thus, even though one system fails completely, the furnace will not be without stock level gaging means.

The reliability of each of the two gaging systems is further increased by designing the circuitry so that gage failure at any given level will not affect the indications at the remaining levels. Thus, even if six of the seven source-detector units should fail, the remaining unit will still provide the necessary stock level information needed for emergency operation.

The overall block diagram of the electrical system is shown in FIG. 14.

The east-west system consists of four detectors. The detectors, as stated, are located at the 6 foot, 8 foot, 11 foot and 14 foot levels. The north-south detector consists of three detectors which, as stated, are located at the 7 foot, 9½ foot and 12½ foot levels. These levels, it will be remembered, are measured from the bottom of the big bell at the top of the furnace, so that the 6 foot level represents a high stock level in the furnace, and the 14 foot level represents a low level in the furnace. Each detector, as indicated before, feeds an amplifier system located in the master control unit located at floor level. This amplifier system receives the signal pulses from the detector units and energizes relay circuits, which, in turn, energize indicator lamps. These relays are also connected to an instrument circuit for recording the level in the furnace.

The schematic diagram of a typical detector unit is given in FIG. 15. This diagram shows the circuitry to consist of a high voltage circuit, an arrangement of Geiger tubes, a cathode follower circuit and a plate supply circuit. In addition, a calibration unit (described in connection with FIG. 13) is also installed to provide for calibration and checking of the detector unit.

The high voltage circuit is shown in the upper part of FIG. 15. It consists of a rectifier tube V-10 (Type 1X2B, for example), and a voltage regulator tube V-11 (Type 5841, for example). The high voltage circuit supplies between 850–950 volts direct current to the Geiger tube circuit. Sixty cycle 110-volts is fed to a transformer T-1 where it is stepped up to a high voltage in the order of about 1550-volts. This voltage is fed to the rectifier circuit consisting of the rectifier tube V-10 and a condenser C-7. The rectified voltage is fed through a resistor R-18 to the voltage regulator tube V-11. The regulated voltage of about 900-volts is then fed to the Geiger tube circuit GM-1 through a resistor R-19. Condensers C-8 and C-9 act as filtering devices. The filtered direct current voltage is then fed directly to the Geiger tube system GM-1 through a resistor R-20. The Geiger tube detector system, as stated, consists of 24 Anton tubes #313. All twenty-four tubes are electrically connected in parallel. A large number of tubes is used to provide very good sensitivity in the detection of gamma rays from the radiation source. On the basis of the field results obtained with the installation herein described, a detector system consisting of fewer than five Geiger tubes can be designed to provide adequate operation. Indeed, present evidence indicates that a system employing a single Geiger tube can be designed to provide adequate gaging.

Whenever a gamma photon energizes a Geiger tube, a negative pulse is generated at the input to a condenser C-10. Each signal pulse is approximately 8-volts negative, decaying exponentially, with a time constant of approximately 200 microseconds. The approximate length of the pulse in time is, therefore, 800 microseconds. This pulse is fed to a grid of a cathode follower tube V-12 (Type 6AK5, for example). A clipped signal output from the cathode follower circuit is applied to a cathode resistor R-22. Clipping action experienced in the tube causes the output from the tube to be a negative 2-volt signal. The clipping action is not a vital function in the cathode follower system; however, tests have shown that more stable operation of the overall detector-amplifier system is obtained when the pulses at this point are clipped.

Also shown in FIG. 15 is the plate supply circuit, this circuit consisting of a transformer T-2, a rectifier tube V-13 (Type GL 6202, for example), a choke coil X-1, and a filter condenser C-12 from which a B+ voltage is transmitted to the cathode follower tube V-12. This voltage is filtered by a resistance-capacitance network consisting of resistors R-25, R-24 and a condenser C-11. This network provides the proper voltages for the cathode follower system with the alternating current ripple removed or reduced to very low levels. This permits the Geiger tube signals to be taken from the resistor R-22 without interference from the ripple originating in the plate supply circuit.

The solenoid S-1 shown in FIG. 15 is part of the calibration unit installed in each detector, as previously mentioned. The calibration section consists of the alternating current solenoid S-1, the lead container 206 (see FIG. 13), and a small piece of radioactive cobalt embedded in the center of a Plexiglas rod, as stated. When the solenoid S-1 is energized, the small radiation source is pulled out of the lead container exposing the Geiger tubes to additional radiation. A greater number of pulses should be observed at the detector output. When the solenoid is deenergized, a spring arrangement pulls the source back into the lead container, thereby shielding the Geiger tubes from the calibration source, as indicated above.

The detector units feed junction boxes 27 and 29 (FIG. 1) which are mounted on the furnace. The north-south detector units feed one junction box system and the east-west detectors feed another junction box system. The junction box system provides for feeding a 110-volt 60-cycle regulated voltage to the transformers T-1 in the detector unit. It also provides for feeding unregulated 60-cycle, 110-volts to the solenoid S-1 when energized by the calibration push-buttons, located in the master control station. In addition, the junction box system provides for transfer of the Geiger tube signals from the cathode follower units, through shielded coaxial cable. This cable is shielded to minimize electrical interference from electrical noise in the blast furnace area.

The master control system, fed by the junction box system, is shown in FIGS. 16, 17, 18 and 19. These figures show the wiring arrangement, the relative positions of the east-west and north-south power supply units, the amplifier units for the various detectors, and the recorder unit. The master control unit also contains the overall operating power system, shown in FIG. 17. The operation of this overall system will be discussed in the following paragraphs, first with regard to the amplifier system, FIG. 16, then as to the power supply system, FIG. 17, and finally as to the recording and indicating system, FIG. 18 and FIG. 19, respectively.

FIG. 16 is a schematic diagram of the amplifier system. This system is in fact more than an amplifying system, since the circuitry shown in FIG. 16 not only includes an amplifier V–1 (Type 6AU6, for example), but also a pulse integrating system using tube V–2 (Type 6A15, for example), and a modified Schmitt trigger circuit V–3 (Type 12AT7, for example), which is used to control a sensitive relay RP–1, and a meter indicating circuit involving a tube V–4 (Type 6C4 or GL 6132, for example). The relative operation of these components will be discussed in the following paragraphs.

The input signal from a given detector unit is fed through a condenser C–1 to the grid of the amplifier tube V–1. The incoming signals, which are negative, are amplified and reversed in polarity, thereby providing a highly positive voltage pulse at pin 5 of the tube V–1. This pulse is in the order of 130 volts or more, and it is fed through a condenser C–4 to the plate of the vacuum tube V–2. The pulse is fed through cathode 5 of the tube V–2 to a resistance-capacitance storage circuit consisting of a resistor R–7 and condensers C–5 and C–6. This resistance-capacitance network is connected to a resistor network made up of resistors R–6 and R–5, which provide a bias to the resistance-capacitance storage system. The voltage which appears across the resistance-capacitance network consisting of resistance R–7 and capacitances C–5 and C–6 is directly proportional to the rate at which positive pulses are fed to the circuit. Thus, in effect, the voltage appearing at pin 5 of tube V–2 consists of two components: (1) the biased voltage from the resistor R–6, and (2) the integrated direct current average of the positive pulses existing across the resistance-capacitance network made up of the resistance R–7 and the capacitance C–5. This voltage is fed to the relay trigger circuit through a resistor R–8 to pin 2 of the Schmitt trigger V–3. Another part of the integrating circuit consists of the second half of the dual diode V–2, represented by pins 1 and 7. This diode performs a clamping or direct current restoration function which restores the voltage on a condenser C–4 after every positive pulse.

The resulting direct current voltage obtained from the integrating circuit is fed to the tube V–3 to energize the sensitive relay RP–1. This circuit is a modified Schmitt trigger circuit. In normal operation, tube V–3 is biased such that the right side is normally conducting, thereby energizing the sensitive relay. This condition will exist whenever the rate of pulses from the detector system is below some arbitrary value. Whenever the rate increases to a preset level, the left side of the tube V–3 will become conductive, thereby deenergizing the relay RP–1. When the relay system becomes deenergized, a switch is closed to energize a neon light such as NE–51 shown in FIG. 19. This neon light is one of the bank of lights 20 (FIG. 1) located on the front of the amplifier unit at the control station 26.

In addition to operating the trigger circuit, the voltage at pin 2 of the vacuum tube V–3 also operates an indicating circuit. The indicating circuit consists of the cathode follower tube V–4, a direct current voltmeter VM–1 and a voltage divider network consisting of resistors R–14 and R–15. This circuit provides a means of measuring the relative voltage changes at grid 2 of the tube V–3 without loading down the integrating circuit. It provides a simple relative measure of voltage variations in the amplifying-integrating system. Each amplifier includes a connection ST in the input thereof for an oscilloscope to facilitate circuit checking and maintenance.

Push-button PB–1 (see also FIG. 19 for corresponding push-buttons related to the several detector units) is used to energize the solenoid S–1 in its corresponding detector unit. Whenever this pushbutton is depressed, the solenoid S–1 is energized whereby the radioactive calibration source is exposed to send signals from the detector unit down through the junction box system through to the amplifier system. This operation ultimately results in a meter deflection on the direct current voltmeter VM–1. Thus, the use of the calibration button permits checking of the overall electrical system from detector unit to amplifier.

As shown in FIG. 17, a double power supply system is used to energize the detector and amplifier units. The power supply A provides power for the east-west detector amplifier units. The second power supply B provides power for the north-south units. These power supply units are supplied by a Sola regulator unit. The output of the Sola transformer also feeds the Speedomax recorder. As indicated previously, the output of the Sola regulating transformer is also fed to the transformer T–1 in the detector units (see FIG. 15). Should one power supply fail, the remaining unit can supply power to both the north-south and the east-west detector amplifier units.

The unregulated 110-volt supply fed from the transformer T (440/110 single phase 60-cycles) is fed to the power system of FIG. 19. The upper part of FIG. 19 shows the connections of the calibration pushbuttons and the solenoids located in the several detector units. Solenoids 6 through 14 correspond to the solenoid S–1 in the detector unit diagram of FIG. 15.

At the center of FIG. 19, can be seen the NE–51 neon lamps responsive to the sensitive relay contacts RP–6, etc., of the amplifier units. The neon lamps are energized through the contacts RP–6, etc., as well as the corresponding power relays 6–8LR through 12½LR. For example, whenever the sensitive relay (RP–1 of FIG. 16) corresponding to the relay RP–6 of FIG. 19 at the 6 foot level is deenergized, the neon light NE–51 in its circuit is also deenergized along with the related power relay 6–8LR. (A similar arrangement prevails for the lower level circuits wherein the sensitive relay for the 8 foot level is designated RP–8, the sensitive relay for the 11 foot level is designated RP–11, etc.) The preceding description will serve to clarify the fact that the relay RP–1 of FIG. 16 is symbolic of any one of the RP relays of FIG. 19.

The circuitry involving the use of the power relays LR (FIG. 19) to light the main signal lamps in the control cabinet and the remote indicator units is shown in the bottom of the center of FIG. 19. For example, whenever the power relay contacts 6–8LR are closed, the burden signal lamp 6–8 is energized, indicating that the stock in the furnace has dropped below the 6 foot level detector unit. The operation of the signal lamp circuits at the other levels is the same. In addition, when the stock level is at its extreme high level, i.e., above the 6 foot level and above the 7 foot level, respectively, flasher circuits including flashers RF–1 and RF–2 are provided to flash a signal when these respective levels are reached.

The stock level recording circuit is shown in FIG. 18. This circuit utilizes the power relay contacts BLR to short out the resistor elements of a voltage dividing network. The voltage dividing network consists of resistors R–26, R–27, etc. The voltage for the voltage dividing network is taken from the supply and the output therefrom is fed to the Speedomax recorder. Whenever power relay contacts are energized, the voltage from the voltage divider is reduced in proportion to the number of relay contacts which are energized. Thus, when a number of detector units are energized by the impingement of strong gamma rays from their corresponding radiation source units on the opposite side of the furnace (this occurs whenever the stock in the furnace falls below a given source-detector system), an equal corresponding number of points are closed, thus reducing the data voltage. This, in turn, causes the recording system to record a low level on the chart.

Relay contacts STR (FIG. 19) are closed when the large bell is open. This closure energizes relay coil BDR which, in turn, opens contacts BDR–1 (FIG. 18), resulting in an immediate maximum up scale reading on the recorder. In this way, a record is maintained of the large bell operation.

The recorder circuit is designed to provide for correct level indications even though individual detector units may be inoperative. This is achieved by having the power relay contacts connected from their corresponding resistors to the ground potential, so that whenever an individual relay circuit is operated, it shorts out all resistors associated with that level. This result would not be obtained if the power relay contacts were connected in parallel with the recorder resistors corresponding to the various levels.

An added advantage of the gage system herein is derived from the fact that it also provides an indication of the mechanical condition of the upper end of the furnace chamber. The protective facing 34 at the upper end of the furnace in time becomes worn and eventually deteriorates to the point where it must be repaired or replaced. When the lining so deteriorates, it usually sags or otherwise shifts its position such that it blocks the path between one or more of the port elements 36 and 38. The resulting signal failure at the indicator station is, under these conditions, a warning to operating personnel that the furnace structure is in the need of attention.

It will be understood that in the ordinary construction of blast furnaces, the top of the furnace from approximately 3 feet below the lower edge of the large bell to a level 9 or 10 feet therebelow, is lined with the facing 34, as stated. This facing is made up of a series of abutting metal plates to take the highly abrasive wear encountered when material is dumped from the large bell. These metal plates are hung from iron work that, in turn, is secured to the outer shell of the furnace. The interior of the furnace below the elevation of the lower edge of the metal plates is lined with refractory brick in the well-known manner. Ordinarily, the refractory material tends to wear away over the life of the furnace until such point is reached that support for the metal plates is lost and these plates tend to become dislodged and fall into the furnace. The actual mechanics of this deterioration can be likened to an unraveling or unwinding of a knitted fabric whereby the plates tend to sag down in a spiral fashion into the furnace.

The construction for the ray ports takes into special account the nature of the wear encountered in the refractory lining, such that the ports are constructed to wear away at the same rate as said refractory lining through which they penetrate. Consequently, erosion of the refractory material does not interfere in any way with the operation of the detection system. This is so because the ray ports at the lower levels are constructed in sections, and as an interior portion of the tube wears away, the remainder is protected by the diaphragms or cups in the remaining intact portion of the tube. However, when the furnace lining has deteriorated to a point where the metal plates tend to "unwind" and would tend to intercept the radioactive rays, this condition is immediately reflected in the operation of the detection system and leads to an indication that such condition of deterioration exists. Thus, the system herein gives the furnace operators a warning of the later stages, which may be dangerous, in the deterioration of the furnace lining, indicating need for reconstruction or repair.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a system for detecting the level of stock in a blast furnace, a furnace structure including outer walls thereof, axially aligned ray port elements extending through opposite walls of said furnace on a selected diameter thereof, a source of radiant energy located at the outer end of one of said ray port elements and a radiant energy detector at the outer end of the other of said ray port elements, an amplifier located remotely from said furnace, a transmission line connecting said ray detector and said amplifier, a control circuit connected to a power source, a circuit breaker in said control circuit, and a connection between the outlet of said amplifier and said circuit breaker for operating the latter upon the passage of radiant energy from said radiant energy source to said radiant energy detector.

2. In a system for detecting the level of stock in a blast furnace, a furnace structure including outer walls thereof, axially aligned ray port elements extending through opposite walls of said furnace on a selected diameter thereof, a source of radiant energy including a shielded holder for radioactive material located at the outer end of one of said ray port elements and a radiant energy detector at the outer end of the other of said ray port elements, an amplifier located remotely from said furnace, a transmission line connecting said ray detector and said amplifier, a control circuit connected to a power source, a circuit breaker in said control circuit, and a connection between the outlet of said amplifier and said circuit breaker for operating the latter upon the passage of radiant energy from said radiant energy source to said radiant energy detector.

3. In a system for detecting the level of stock in a blast furnace, a furnace structure including outer walls thereof, axially aligned ray port elements extending through opposite walls of said furnace on a selected diameter thereof, a source of radiant energy including a shielded holder for radioactive material located at the outer end of one of said ray port elements and a Geiger tube circuit at the outer end of the other of said ray port elements for detecting the passage of radiant energy therethrough, an amplifier located remotely from said furnace, a transmission line connecting said Geiger tube circuit and said amplifier, a control circuit connected to a power source, a circuit breaker in said control circuit, and a connection between the outlet of said amplifier and said circuit breaker for operating the latter upon the passage of radiant energy from said radiant energy source to said Geiger tube circuit.

4. In a system for detecting the level of stock in a blast furnace, a furnace structure including outer walls thereof, axially aligned ray port elements extending through opposite walls of said furnace on a selected diameter thereof, a source of radiant energy located at the outer end of one of said ray port elements and a radiant energy detector at the outer end of the other of said ray port elements, an amplifier located remotely from said furnace, a transmission line connecting said ray detector and said amplifier, a control circuit connected to a power source, a circuit breaker in said control circuit, a connection between the outlet of said amplifier and said circuit breaker for operating the latter upon the passage of radiant energy from said radiant energy source to said radiant energy detector, and an indicator remote from said detector under control of said circuit breaker whereby the state of said detector is reflected.

5. In a system for detecting the level of stock in a blast furnace, a furnace structure including outer walls thereof, axially aligned ray port elements extending through opposite walls of said furnace on a selected diameter thereof, a source of radioactive radiation located at the outer end of one of said ray port elements and a plurality of parallel Geiger tubes at the outer end of the other of said ray port elements, an integrating circuit for the output of said Geiger tubes adapted to produce an output voltage proportional to radiation to which said tubes are subjected, an amplifier located remotely from said furnace, a transmission line connecting said integrating circuit and said amplifier, a control circuit connected to a power source, a circuit breaker in said control circuit, and a connection between the outlet of said amplifier and said circuit breaker for operating the latter upon the passage of radiant energy from said radiant energy source to said Geiger tubes.

6. In a system for detecting the level of stock in a blast furnace, a furnace structure including outer walls thereof, a plurality of parallel ray ports extending through opposite walls of said furnace on vertically spaced diameters thereof, each said ports comprising axially aligned elements in opposite portions of said furnace wall, a source of radiant energy located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

7. In a system for detecting the level of stock in a blast furnace, a furnace structure including outer walls thereof, a plurality of parallel ray ports extending through opposite walls of said furnace on vertically spaced diameters thereof, each said ports comprising axially aligned elements in opposite portions of said furnace wall, a source of radiant energy including a shielded holder for radioactive material located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

8. In a system for detecting the level of stock in a blast furnace, a furnace structure including outer walls thereof, a plurality of parallel ray ports extending through opposite walls of said furnace on vertically spaced diameters thereof, each said ports comprising axially aligned elements in opposite portions of said furnace wall, a source of radiant energy including a shielded holder for radioactive material located at one outer end of each of said ray ports and a Geiger tube circuit at the other outer end of each of said ray ports for detecting the passage of radiant energy therethrough, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired Geiger tube circuit.

9. In a system for detecting the level of stock in a blast furnace, a furnace structure including outer walls thereof, a plurality of parallel ray ports extending through opposite walls of said furnace on vertically spaced diameters thereof, each said ports comprising axially aligned elements in opposite portions of said furnace wall, a source of radiant energy located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, a connection between the outlet of said amplifier and said circuit breakers for operating the latter upon the passage of radiant energy from a respective radiant energy source to its paired radiant energy detector, and an indicator remote from said detectors under control of each of said circuit breakers whereby the state of said detectors is reflected.

10. In a system for detecting the level of stock in a blast furnace, a furnace structure including outer walls thereof, a plurality of parallel ray ports extending through opposite walls of said furnace on vertically spaced diameters thereof, each said ports comprising axially aligned elements in opposite portions of said furnace wall, a source of radioactive radiation located at one outer end of each of said ray ports and a plurality of parallel Geiger tubes at the other outer end of each of said ray ports, an integrating circuit for the output of said Geiger tubes adapted to produce an output voltage proportional to radiation to which said tubes are subjected, an amplifier located remotely from said furnace, a transmission line connecting said integrating circuit and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

11. In a system for detecting the level of stock in a blast furnace, a furnace structure including outer walls thereof, a first ray port comprising axially aligned elements extending through opposite walls of said furnace on a selected diameter thereof, a second ray port comprising axially aligned elements extending through opposite walls of said furnace on a vertically spaced and angularly removed diameter thereof, a source of radiant energy located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

12. In a system for detecting the level of stock in a blast furnace, a furnace structure including outer walls thereof, a first ray port comprising axially aligned elements extending through opposite walls of said furnace on a selected diameter thereof, a second ray port comprising axially aligned elements extending through opposite walls of said furnace on a vertically spaced and angularly removed diameter thereof, a source of radiant energy including a shielded holder to radioactive material located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

13. In a system for detecting the level of stock in a blast furnace, a furnace structure including outer walls thereof, a first ray port comprising axially aligned elements extending through opposite walls of said furnace on a selected diameter thereof, a second ray port comprising axially aligned elements extending through opposite walls of said furnace on a vertically spaced and angularly removed diameter thereof, a source of radiant energy including a shielded holder for radio active material located at one outer end of each of said ray ports and a Geiger tube circuit at the other outer end of each of said ray ports for detecting the passage of radiant energy therethrough, an amplifier located remotely from said furnace, a transmission line connecting said Geiger tube circuit and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired Geiger tube circuit.

14. In a system for detecting the level of stock in a blast furnace, a furnace structure including outer walls thereof, a first ray port comprising axially aligned elements extending through opposite walls of said furnace on a selected diameter thereof, a second ray port comprising axially aligned elements extending through opposite walls of said furnace on a vertically spaced and angularly removed diameter thereof, a source of radiant energy located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, a connection between the outlet of said amplifier and said circuit breakers for operating the latter upon the passage of radiant energy from a respective radiant energy source to its paired radiant energy detector, and an indicator remote from said detectors under control of said circuit breakers whereby the state of said detectors is reflected.

15. In a system for detecting the level of stock in a blast furnace, a furnace structure including outer walls thereof, a first ray port comprising axially aligned elements extending through opposite walls of said furnace on a selected diameter thereof, a second ray port comprising axially aligned elements extending through opposite walls of said furnace on a vertically spaced and angularly removed diameter thereof, a source of radio active radiation located at one outer end of each of said ray ports and a plurality of parallel Geiger tubes at the other outer end of each of said ray ports, an integrating circuit for the output of said Geiger tubes adapted to produce an output voltage proportional to radiation to which said tubes are subjected, an amplifier located remotely from said furnace, a transmission line connecting said integrating circuit and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired Geiger tube.

16. In a system for detecting the level of stock in a blast furnace, a furnace structure including outer walls thereof, a first plurality of parallel ray ports extending through opposite walls of said furnace on vertically spaced diameters thereof, a second plurality of parallel ray ports extending through opposite walls of said furnace in staggered vertically spaced relation to said first plurality of ray ports and on angularly removed diameters of said furnace, each of said ports comprising axially aligned elements in opposite portions of said furnace wall, a source of radiant energy located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

17. In a system for detecting the level of stock in a blast furnace, a furnace structure including outer walls thereof, a first plurality of parallel ray ports extending through opposite walls of said furnace on vertically spaced diameters thereof, a second plurality of parallel ray ports extending through opposite walls of said furnace in staggered vertically spaced relation to said first plurality of ray ports and on angularly removed diameters of said furnace, each of said ports comprising axially aligned elements in opposite portions of said furnace wall, a source of radiant energy including a shielded holder for radioactive material located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

18. In a system for detecting the level of stock in a blast furnace, a furnace structure including outer walls thereof, a first plurality of parallel ray ports extending through opposite walls of said furnace on vertically spaced diameters thereof, a second plurality of parallel ray ports extending through opposite walls of said furnace in staggered vertically spaced relation to said first plurality of ray ports and on angularly removed diameters of said furnace, each of said ports comprising axially aligned elements in opposite portions of said furnace wall, a source of radiant enregy including a shielded holder for radioactive material located at one outer end of each of said ray ports and a Geiger tube circuit at the other outer end of each of said ray ports for detecting the passage of radiant energy therethrough, an amplifier located remotely from said furnace, a transmission line connecting said ray detectors and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired Geiger tube circuit.

19. In a system for detecting the level of stock in a blast furnace, a furnace structure including outer walls thereof, a first plurality of parallel ray ports extending through opposite walls of said furnace on vertically spaced diameters thereof, a second plurality of parallel ray ports extending through opposite walls of said furnace in staggered vertically spaced relation to said first plurality of ray ports and on angularly removed diameters of said furnace, each of said ports comprising axially aligned elements in opposite portions of said furnace wall, a source of radiant energy located at one outer end of each of said ray ports and a radiant energy detector at the other outer end of each of said ray ports, an amplifier located remotely from said furnace, a transmission line connecting said ray detectors and said amplifier, a control circuit connected to a power source, a circuit breaker for each of said ray detectors in said control circuit, a connection between the outlet of said amplifier and said circuit breakers for operating the latter upon the passage of radiant energy from a respective radiant energy source to its paired radiant energy detector, and an indicator controlled by each of said circuit breakers adapted to reflect the status of said respective energy detectors.

20. In a system for detecting the level of stock in a blast furnace, a furnace structure including outer walls thereof, a first plurality of parallel ray ports extending through opposite walls of said furnace on vertically spaced diameters thereof, a second plurality of parallel ray ports extending through opposite walls of said furnace in staggered vertically spaced relation to said first plurality of ray ports and on angularly removed diameters of said furnace, each of said ports comprising axially aligned elements in opposite portions of said furnace wall, a source of radioactive radiation located at one outer end of each of said ray ports and a plurality of parallel Geiger tubes at the other outer end of each of said ray ports, an integrating circuit for the output of said Geiger tubes adapted to produce an output voltage proportional to the radiant energy to which said tubes are subjected, an amplifier located remotely from said furnace, a transmission line connecting said integrating circuits and said amplifier, a control circuit connected to a power source, a circuit breaker for each of said ray detectors in said control circuit, and a connection between the outlet of said amplifier and said circuit breakers for operating the latter upon the passage of radiant energy from a respective radiant energy source to its paired radiant energy detector.

21. In a system for detecting the level of stock in a furnace, a furnace structure including outer walls thereof, opposed and axially aligned ray port elements extending through the walls of said furnace in a selected direction therethrough, a source of radiant energy located at the outer end of one of said ray port elements and a radiant energy detector at the outer end of the other of said ray port elements, an amplifier located remotely from said furnace, a transmission line connecting said ray detector and said amplifier, a control circuit connected to a power source, a circuit breaker in said control circuit, and a connection between the outlet of said amplifier and said circuit breaker for operating the latter upon the passage of radiant energy from said radiant energy source to said radiant energy detector.

22. A radiation beam port for blast furnace walls subject to erosion in use, comprising a tubular conduit subject to erosion at a rate substantially the same as the erosion rate of the furnace wall, a plurality of cupped window members permeable to radiation within said conduit, said window members each having a bottom web extending across the diameter of said conduit substantially closing the same against entrance of foreign solids, and a peripheral flange disposed substantially perpendicular in reference to said bottom web, said flange being adapted to substantially engage the internal wall of said conduit and constitute also a spacing element between adjacent window members.

23. The beam port defined in claim 22, in which said tubular conduit is a furnace brick structure and said window members are physically separated from each other within said structure, whereby successive window members are free to drop into the furnace as said tubular conduit and the furnace wall erode during use.

24. The beam port defined in claim 22, in which said tubular member has an outer end adapted to extend adjacent the outer wall of a furnace and an inner end adapted to extend into the furnace, and in which said plurality of window members are disposed with the flanges thereof extending toward the outer end of said tubular member, whereby the webs of successive window members comprise closures across the inner end of said tubular member as the length of the latter is decreased by erosion thereof.

25. A window for radiation beam ports comprising a cupped member permeable to radiation, said member having a bottom web adapted to extend across the diameter of a tubular beam port substantially closing the same to the entrance of foreign solids thereto, and a peripheral flange disposed substantially perpendicular in reference to said bottom web, said flange being adapted to substantially engage the internal walls of a tubular beam port and provide also a spacing element for said member.

References Cited in the file of this patent

UNITED STATES PATENTS

| | | |
|---|---|---|
| 2,617,953 | Brasch | Nov. 11, 1952 |
| 2,659,017 | Bartow | Nov. 10, 1953 |
| 2,674,695 | Grace | Apr. 6, 1954 |
| 2,734,136 | Atchison | Feb. 7, 1956 |
| 2,828,422 | Steierman | Mar. 25, 1958 |
| 2,872,587 | Stein | Feb. 3, 1959 |
| 2,889,464 | Ruehle | June 2, 1959 |
| 2,960,607 | Kohl | Nov. 15, 1960 |